(12) United States Patent
Wei et al.

(10) Patent No.: US 11,853,502 B1
(45) Date of Patent: Dec. 26, 2023

(54) DISPLAY PANEL AND DISPLAY DEVICE HAVING TOUCH ELECTRODE CONNECTING PADS DISPOSED IN ARC SHAPE

(71) Applicants: Wuhan Tianma Micro-Electronics Co., Ltd., Wuhan (CN); Wuhan Tianma MicroElectronics Co., Ltd. Shanghai Branch, Shanghai (CN)

(72) Inventors: Qibing Wei, Shanghai (CN); Peng Zhang, Shanghai (CN); Xingyao Zhou, Shanghai (CN); Wei Liu, Shanghai (CN)

(73) Assignees: WUHAN TIANMA MICRO-ELECTRONICS CO., LTD., Wuhan (CN); WUHAN TIANMA MICROELECTRONICS CO., LTD. SHANGHAI BRANCH, Shanghai (CN)

( * ) Notice: Subject to any disclaimer, the term of this patent is extended or adjusted under 35 U.S.C. 154(b) by 0 days.

(21) Appl. No.: 17/958,168

(22) Filed: Sep. 30, 2022

(30) Foreign Application Priority Data

Jun. 27, 2022 (CN) .......................... 202210744571.0

(51) Int. Cl.
*G06F 3/041* (2006.01)
*G06F 3/044* (2006.01)

(52) U.S. Cl.
CPC .......... *G06F 3/04164* (2019.05); *G06F 3/044* (2013.01); *G06F 2203/04103* (2013.01)

(58) Field of Classification Search
CPC ................. G06F 3/04164; G06F 3/044; G06F 2203/04103
See application file for complete search history.

(56) References Cited

U.S. PATENT DOCUMENTS

| | | | | |
|---|---|---|---|---|
| 8,497,430 | B2 * | 7/2013 | Kuwajima | G06F 3/041 |
| | | | | 174/250 |
| 10,838,532 | B2 * | 11/2020 | Abe | G06F 3/0443 |
| 2020/0175917 | A1 * | 6/2020 | Jo | G09G 3/20 |
| 2021/0286465 | A1 * | 9/2021 | Jung | G06F 3/04164 |
| 2021/0397302 | A1 * | 12/2021 | Yang | G06F 3/0412 |

FOREIGN PATENT DOCUMENTS

| | | | | |
|---|---|---|---|---|
| CN | 111913604 A | * | 11/2020 | ........... G06F 3/0447 |
| CN | 112114699 A | * | 12/2020 | ......... G02F 1/13338 |
| CN | 112114699 A | | 12/2020 | |
| CN | 112946944 A | * | 6/2021 | ......... G02F 1/13306 |
| CN | 112946944 A | | 6/2021 | |

* cited by examiner

*Primary Examiner* — Darlene M Ritchie
(74) *Attorney, Agent, or Firm* — Anova Law Group, PLLC

(57) ABSTRACT

Display panel and display device are provided. The display panel includes an array substrate and a cover plate disposed opposite to the array substrate, touch electrode layers on a side of the cover plate facing the array substrate, and a plurality of first touch pads and a plurality of second touch pads disposed opposite to the plurality of the first touch pads. Each of the array substrate and the cover plate include a display area and a non-display area at least partially surrounding the display area. The non-display area of the array substrate includes a step area provided with bonding pads. The non-display area of the array substrate includes at least one irregularly-shaped area adjacent to the step area. A first touch pad is electrically connected to a second touch pad.

16 Claims, 11 Drawing Sheets

100

DISPLAY PANEL AND DISPLAY DEVICE HAVING TOUCH ELECTRODE CONNECTING PADS DISPOSED IN ARC SHAPE

CROSS-REFERENCE TO RELATED APPLICATION

This application claims priority of Chinese Patent Application No. 202210744571.0, filed on Jun. 27, 2022, the entire contents of which are hereby incorporated by reference.

FIELD OF THE DISCLOSURE

The present disclosure generally relates to the field of display technology and, more particularly, relates to a display panel and a display device.

BACKGROUND

With a continuous development and integration of displays and touch technologies of various electronic products, touch technologies have been constantly integrated into displays. At present, a mainstream touch screen is an in-cell display screen. The in-cell touch screen embeds touch electrodes of a touch screen inside a conventional display screen, which can reduce a thickness of a display module, reduce a production cost, and is favored by consumers and panel manufacturers.

However, borders of an existing touch display panel are relatively wide. It is difficult to achieve an effect of narrow borders, which limits further development of the touch display panel.

BRIEF SUMMARY OF THE DISCLOSURE

One aspect of the present disclosure provides a display panel. The display panel includes an array substrate and a cover plate disposed opposite to the array substrate, touch electrode layers on a side of the cover plate facing the array substrate, and a plurality of first touch pads and a plurality of second touch pads disposed opposite to the plurality of first touch pads. Each of the array substrate and the cover plate include a display area and a non-display area at least partially surrounding the display area. The non-display area of the array substrate includes a step area provided with bonding pads. The non-display area of the array substrate includes at least one irregularly-shaped area adjacent to the step area. A first touch pad is electrically connected to a second touch pad. The first touch pad is in an irregularly-shaped area of the cover plate and is electrically connected to a touch electrode layer. The second touch pad is in an irregularly-shaped area of the at least one irregularly-shaped area on the array substrate and is electrically connected to a bonding pad in the step area.

Another aspect of the present disclosure provides a display device. The display device includes a display panel. The display panel includes an array substrate and a cover plate disposed opposite to the array substrate, touch electrode layers on a side of the cover plate facing the array substrate, and a plurality of first touch pads and a plurality of second touch pads disposed opposite to the plurality of first touch pads. Each of the array substrate and the cover plate include a display area and a non-display area at least partially surrounding the display area. The non-display area of the array substrate includes a step area provided with bonding pads. The non-display area of the array substrate includes at least one irregularly-shaped area adjacent to the step area. A first touch pad is electrically connected to a second touch pad. The first touch pad is in an irregularly-shaped area of the cover plate and is electrically connected to a touch electrode layer. The second touch pad is in an irregularly-shaped area of the at least one irregularly-shaped area on the array substrate and is electrically connected to a bonding pad in the step area.

Other aspects of the present disclosure can be understood by a person skilled in the art in light of the description, the claims, and the drawings of the present disclosure.

BRIEF DESCRIPTION OF THE DRAWINGS

Accompanying drawings, which are incorporated in and constitute part of the present specification, illustrate embodiments of the disclosure and together with a description, serve to explain principles of the disclosure.

DETAILED DESCRIPTION

Various exemplary embodiments of the present disclosure will be described in detail with reference to the accompanying drawings. It should be noted that, unless specifically stated otherwise, a relative arrangement of components and steps, numerical expressions and numerical values set forth in the embodiments do not limit the scope of the present disclosure.

The following description of at least one exemplary embodiment is merely illustrative and is not intended to limit the disclosure and application or use thereof.

Techniques, methods, and apparatus known to a person skilled in the art may not be discussed in detail, but where appropriate, such techniques, methods, and apparatus should be considered as part of the present specification.

In all examples shown and discussed herein, any specific value should be construed as illustrative only and not as a limitation. Accordingly, other examples of exemplary embodiments may have different values.

It will be apparent to a person skilled in the art that various modifications and variations can be made in the present disclosure without departing from the spirit or scope of the disclosure. Accordingly, the present disclosure is intended to cover the modifications and variations of the present disclosure that fall within the scope of corresponding claims (claimed technical solutions) and equivalents thereof. It should be noted that, implementations provided in the embodiments of the present disclosure may be combined with each other if there is no contradiction.

It should be noted that similar numerals and letters refer to similar items in the following accompanying drawings. Once an item is defined in one accompanying drawing, it does not require further discussion in subsequent accompanying drawings.

Figure 1:
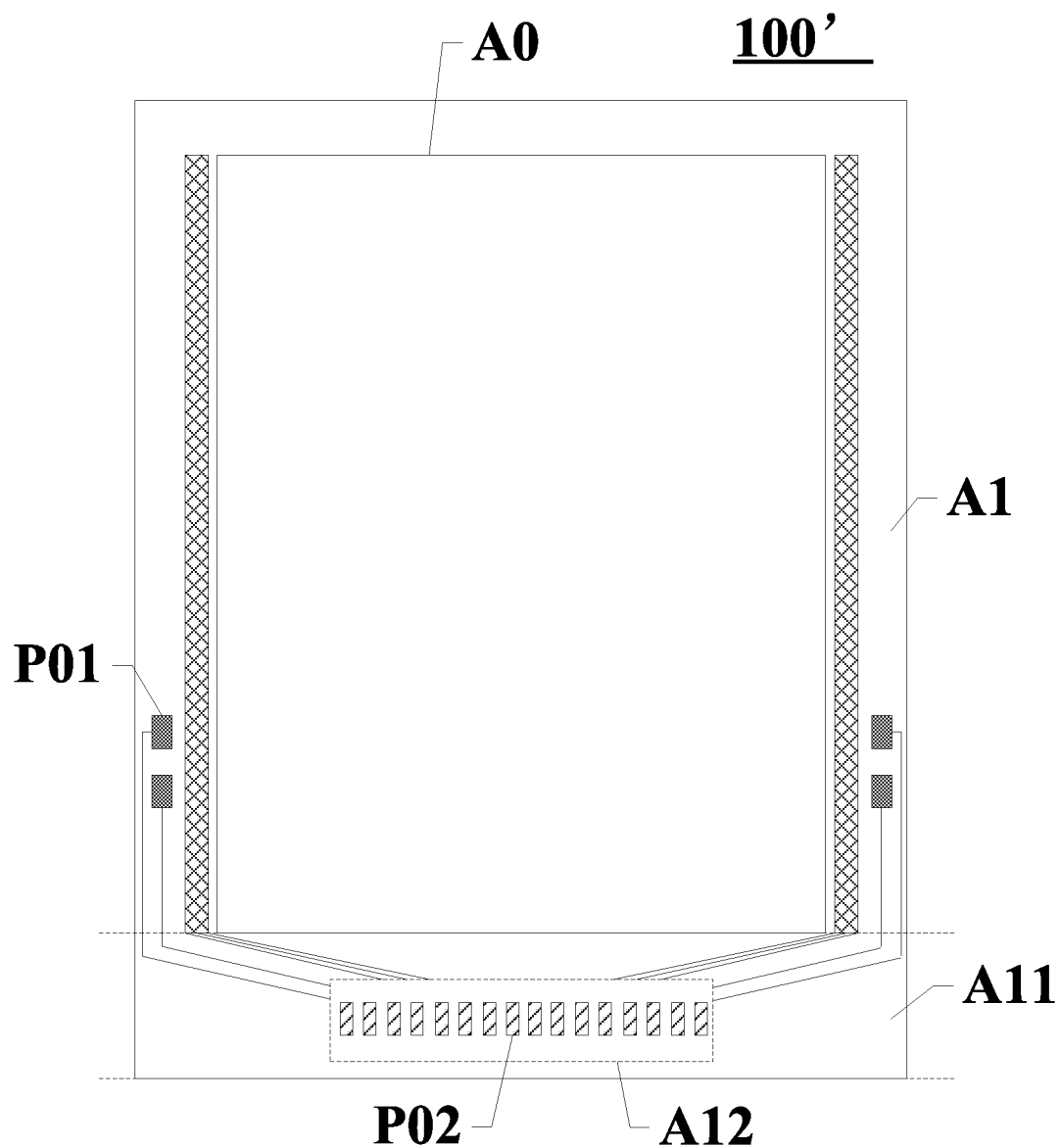
FIG. 1 illustrates a structural view of a touch display panel.

Compared with an external touch display panel (i.e., a touch panel is disposed independent of a display panel, and the touch panel is attached to an encapsulation layer of the display panel), an overall thickness of an in-cell touch display panel is thinner. In the in-cell touch display panel, touch pads are adopted to electrically connect touch electrodes with bonding pads in a bonding area on a display panel array substrate, so that the touch electrodes are driven by driving chips. FIG. 1 illustrates a structural view of a touch display panel 100'. The touch display panel 100' includes a display area A0 and a non-display area A1 surrounding the display area A0. The non-display area A1 includes a step area A11 and peripheral circuit areas. The step area A11 is at a lower border of the array substrate and is configured for disposing bonding pads and other auxiliary circuits such as ESD circuits. The step area A11 includes a bonding area A12, and the peripheral circuit areas (e.g., left and right border areas) include a plurality of touch pads P01. The touch pad P01 is a pair of pads disposed opposite to each other, one of which is on the array substrate, and the other of which is on a package cover plate. The touch pads in a related art are in the peripheral circuit areas, i.e., are in borders on the left and right sides of the touch display panel and are electrically connected to the bonding pads P02 in the bonding area A12 through fan-out traces. Due to requirements of process and contact resistance, a size of a touch pad P01 is generally several hundreds of microns, which greatly occupies a space of the left and right borders of the touch display panel and is not conducive to realizing narrow border design of the display panel.

In view of the above, the present disclosure provides a display panel, including: an array substrate and a cover plate disposed opposite to the array substrate, each of the array substrate and the cover plate including a display area and a non-display area at least partially surrounding the display area, the non-display area of the array substrate including a step area provided with bonding pads; the non-display area of the array substrate including at least one irregularly-shaped area adjacent to the step area; touch electrode layers on a side of the cover plate facing the array substrate; and a plurality of first touch pads and a plurality of second touch pads disposed opposite to the plurality of first touch pads, a first touch pad being electrically connected to a second touch pad, the first touch pads being in an irregularly-shaped area of the cover plate and being electrically connected to a touch electrode layer, and the second touch pad being in an irregularly-shaped area of the array substrate, and being electrically connected to a bonding pad in the step area. The plurality of second touch pads is disposed in the irregularly-shaped area, which does not occupy a space of the step area and the left and right border areas of the display panel and is conducive to realizing narrow border design of the in-cell display panel and the display device.

The above is a core idea of the present disclosure, and technical solutions in the embodiments of the present disclosure will be clearly and completely described below with reference to the accompanying drawings in the embodiments of the present disclosure. Based on the embodiments of the present disclosure, all other embodiments obtained by a person skilled in the art without creative efforts fall within the protection scope of the embodiments of the present disclosure.

Figure 2:
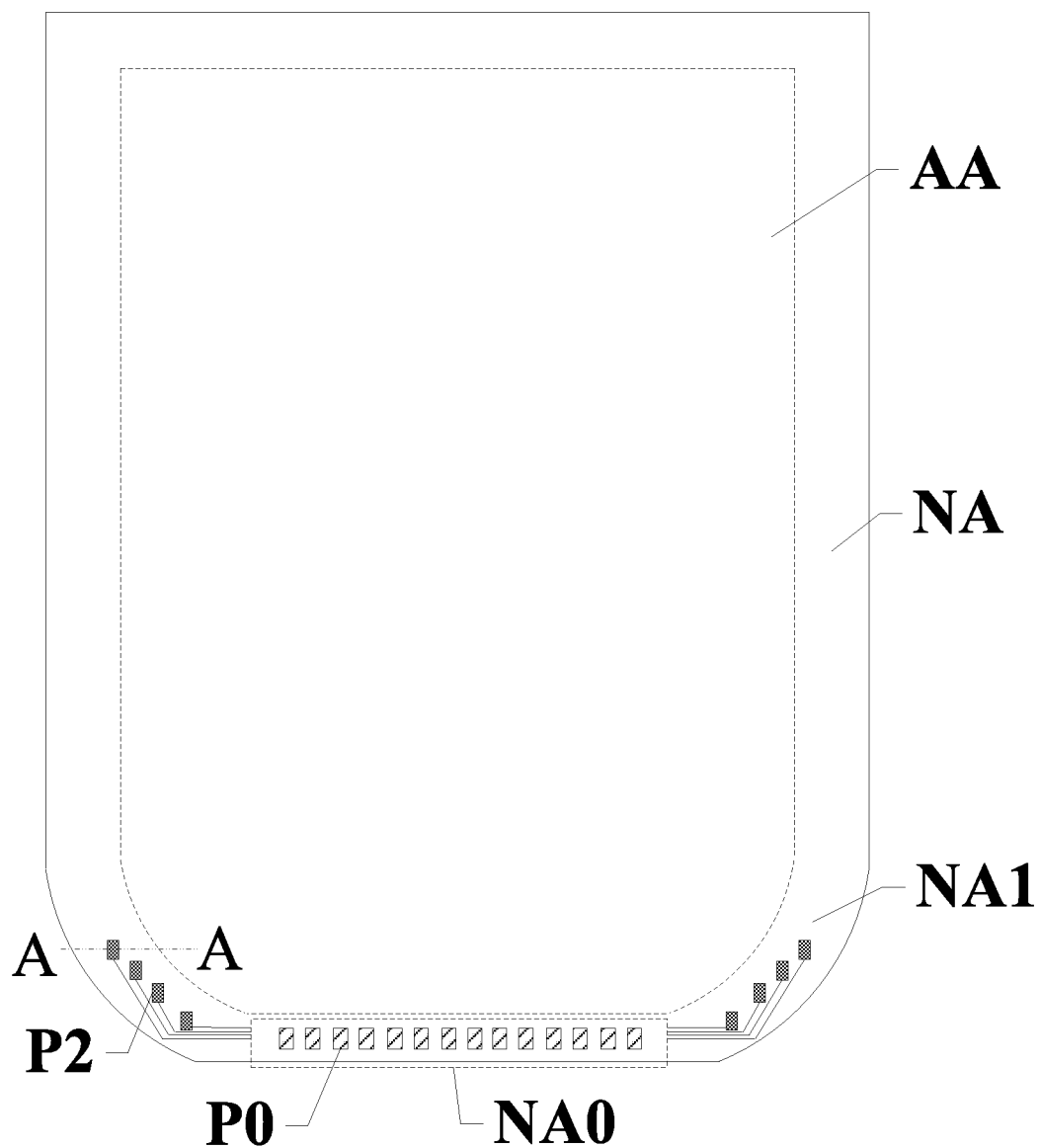
FIG. 2 illustrates a structural view of a display panel according to one embodiment of the present disclosure.
Figure 3:
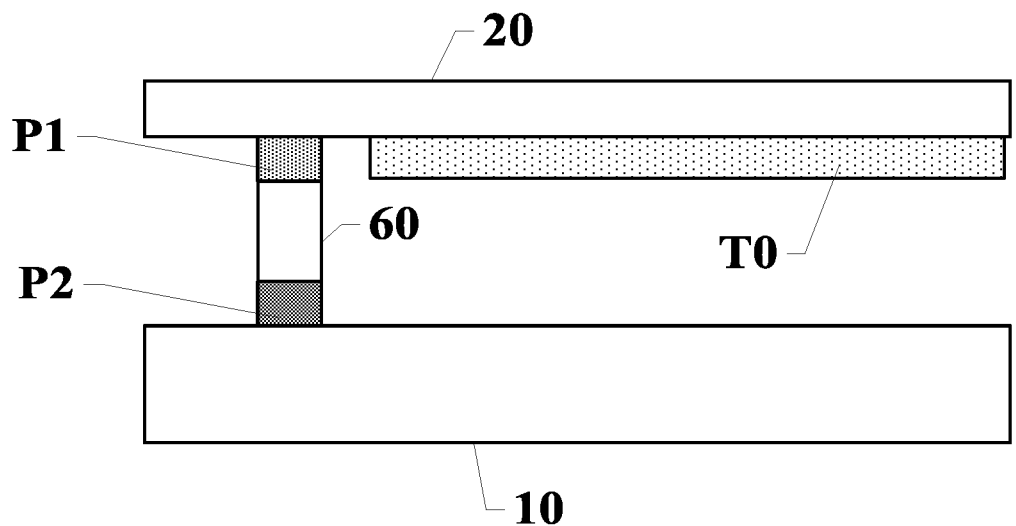
FIG. 3 illustrates a sectional view of the display panel in FIG. 2 along an AA direction.

FIG. 2 illustrates a structural view of a display panel according to one embodiment of the present disclosure FIG. 3 illustrates a sectional view of the display panel in FIG. 2 along an AA direction. Referring to FIG. 2 and FIG. 3, in the embodiment, a display panel 100 is provided. The display panel 100 includes: an array substrate 10 and a cover plate 20 disposed opposite to the array substrate 10, each of the array substrate 10 and the cover plate 20 including a display area AA and a non-display area NA at least partially surrounding the display area AA, the non-display area NA of the array substrate 10 including a step area NA0 provided with bonding pads P0; the non-display area NA of the array substrate 10 including at least one irregularly-shaped area NA1 adjacent to the step area NA0; touch electrode layers T0 on a side of the cover plate 20 facing the array substrate 10; and a plurality of first touch pads P1 and a plurality of second touch pads P2 disposed opposite to the plurality of first touch pads P1, a first touch pad P1 being electrically connected to a second touch pad P2, the first touch pad P1 being in an irregularly-shaped area NA1 of the cover plate 20 and being electrically connected to a touch electrode layer T0, and the second touch pad P2 being in an irregularly-shaped area NA1 of the array substrate 10, and being electrically connected to a bonding pad P0 of the step area NA0.

Figure 4:
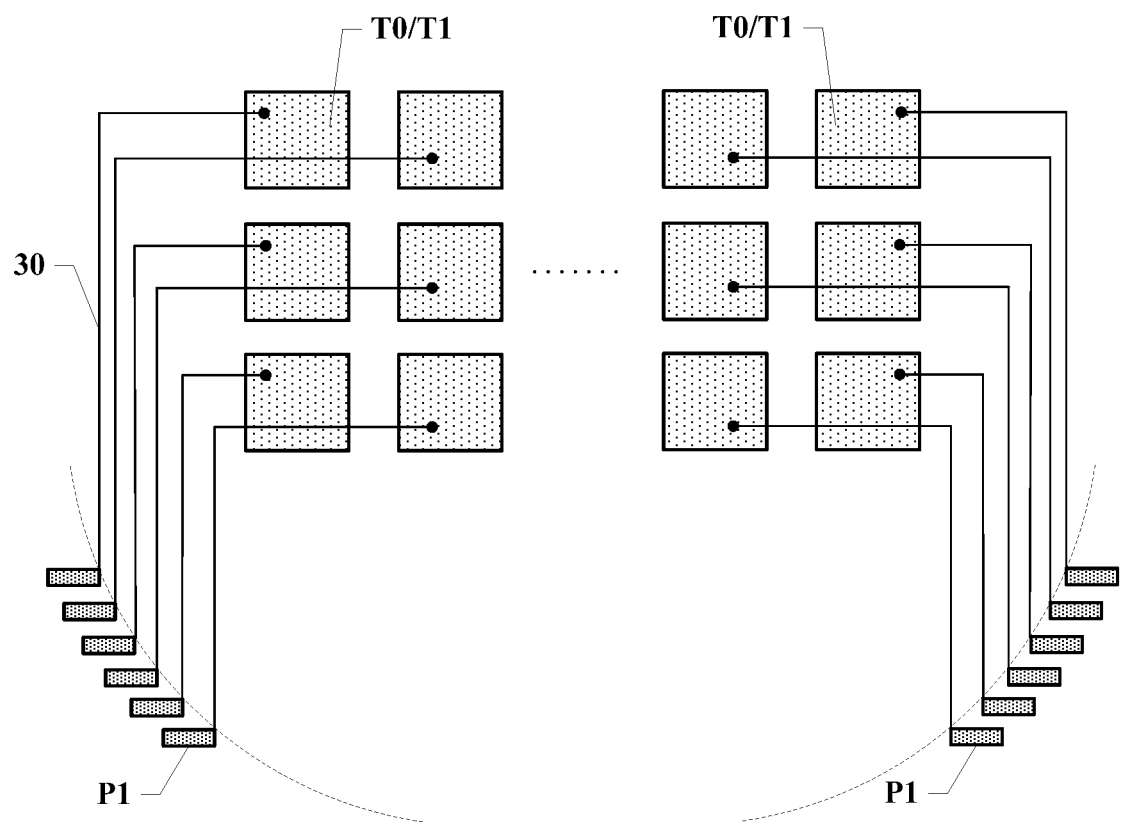
FIG. 4 illustrates a layout diagram of touch traces on touch electrode layers according to one embodiment of the present disclosure.

Specifically, the display panel provided by the embodiment is an in-cell touch display panel, which can detect a position touched by a finger by using a principle of self-capacitance or mutual-capacitance. In-cell self-capacitive touch display panels are widely used due to high touch sensing accuracy and high signal-to-noise ratio thereof. FIG. 4 illustrates a layout diagram of touch traces on touch electrode layers according to one embodiment of the present disclosure. A working principle of the In-cell self-capacitive touch display panel is as follows: a plurality of self-capacitance electrodes T1 on a same layer and independent of each other are disposed on the touch electrode layers T0, each self-capacitance electrode T1 is electrically connected to a first touch pad P1 disposed in the irregularly-shaped area of the cover plate through a separate lead wire, and the first touch pads P1 are electrically connected to the binding pads P0 through the second touch pads P2, thereby realizing connections with control chips. When a human body does not touch a screen, a load capacitance of each self-capacitance electrode T1 is a fixed value. When the human body touches the screen, a load capacitance of a self-capacitance electrode P1 corresponding to a touch position is a fixed value plus a human body capacitance. The touch position can be determined by detecting a capacitance value change of each self-capacitance electrode P1. In some other embodiments of the present disclosure, the touch electrode layer TO on the side of the cover plate 20 facing the array substrate 10 can also include mutual capacitive touch electrodes. A touch detection function can also be realized through the mutual capacitive touch electrodes. The mutual capacitive touch electrodes can be disposed on a same layer or on different film layers, which are not specifically limited herein.

Referring to FIGS. 1-4, in one embodiment, the display panel is an irregularly-shaped display panel. Optionally, the irregularly-shaped area NA1 is on at least one side of the step area NA0. In the embodiment, the irregularly-shaped area NA1 being on two sides of the step area NA0 is taken as an example for illustration. Optionally, the irregularly-shaped area NA1 can be regarded as an area connecting the left and right borders of the display panel 100 and the step area NA0. Optionally, the step area NA0 is provided with bonding pads P0, and the bonding pads P0 are configured for bonding with driving chips or flexible circuit boards, to realize electrical connections between a circuit structure on the display panel and the driving chips. For the touch electrode layer TO on the cover plate 20, the touch electrodes on the touch electrode layer TO are electrically connected to the second touch pads P2 on the array substrate 10 through the first touch pads P1 on the cover plate 20. Since the second touch pads P2 are electrically connected to the bonding pads P0 in the step area NA0, electrical connections between the touch electrodes on the touch electrode layer TO and the bonding pads P0 are realized, thereby realizing a transmission of touch signal.

When the display panel is embodied as an irregularly-shaped structure as shown in FIG. 2, there are relatively few traces or circuit components disposed in an area where the irregularly-shaped area NA1 is located. In one embodiment, when the second touch pads P2 are disposed in the irregularly-shaped area NA1, a free space on the display panel is rationally utilized to prevent the second touch pads P2 from occupying the space of the left and right borders of the display panel and a space of the step area NA0. Therefore, a phenomenon that borders of the display panel cannot be further compressed when the second touch pads P2 are at the left and right borders or in the step area NA0 of the display panel is avoided. A certain compression space is reserved for the left and right borders of the display panel 100 and the step area NA0 by changing positions of the first touch pads P1 and the second touch pads P2, which is conducive to reducing border widths and realizing narrow border design of the in-cell display panel.

Optionally, referring to FIG. 3, in one embodiment, shapes and sizes of the array substrate 10 and the cover plate 20 may be exactly same. An arrangement opposite to each other can be understood that a projection of the array substrate 10 completely overlaps a projection of the cover plate 20 along a thickness direction of the display panel. Optionally, the first touch pads P1 on the cover plate 20 and the second touch pads P2 on the array substrate 10 are disposed opposite to each other and are electrically connected in one-to-one correspondence. Optionally, a correspondingly disposed first touch pad P1 and second touch pad P2 may be electrically connected through a conductor 60 disposed therebetween, e.g., may be electrically connected through a conductive silver glue, or electrically connected through a soldering post, which is not limited herein, provided that an electrical connection between the first touch pad P1 and the second touch pad P2 can be achieved. Optionally, along an overlapping direction of the array substrate 10 and the cover plate 20, the correspondingly disposed first touch pads P1 and second touch pads P2 overlap. Further, along the overlapping direction of the array substrate 10 and the cover plate 20, the correspondingly disposed first touch pads P1 and second touch pads P2 coincide. Therefore, when an electrical connection between the first touch pads P1 and the second touch pads P2 is realized by using the conductor 60, contact areas of the first touch pad P1 and the second touch pad P2 with the conductor 60 are respectively increased, thereby helping improve reliability of an electrical connection between the first touch pad P1 and the second touch pad P2.

Optionally, a driver circuit is provided on the array substrate 10. The driver circuit may be a pixel driver circuit including two transistors and a capacitor, which is often referred to as a "2T1C" pixel driver circuit in the art, and may also be a pixel driving circuit including seven transistors and one capacitor or eight transistors and one capacitor, which is often referred to as a "7T1C" pixel driving circuit or "8T1C pixel driving circuit" in the art. For a specific structure of the pixel driving circuit, reference may be made to the design in the related art, which is not repeated herein.

Optionally, in one embodiment, the cover plate 20 may be a glass cover plate, a thin film encapsulation layer or the like. The display area AA of the cover plate 20 completely overlaps the display area AA of the array substrate 10, and the non-display area NA of the cover plate 20 also completely overlaps the non-display area NA of the array substrate 10.

Figure 5:
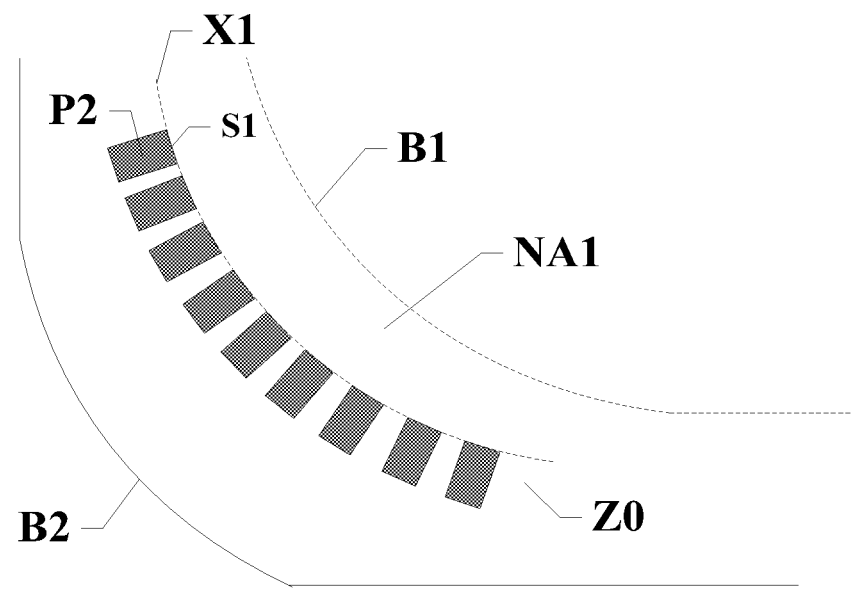
FIG. 5 illustrates an arrangement diagram of second touch pads in an irregularly-shaped area of a display panel according to one embodiment of the present disclosure.

FIG. 5 illustrates an arrangement diagram of the second touch pads P2 in the irregularly-shaped area NA1 of the display panel according to one embodiment of the present disclosure. It can be understood that the embodiment of FIG. 5 only illustrates an arrangement structure of the second touch pads P2 in the irregularly-shaped area NA1 and does not limit an actual number and sizes of the second touch pads P2 in the irregularly-shaped area NA1.

Referring to FIG. 2 and FIG. 5, in one optional embodiment, the irregularly-shaped area NA1 includes a first arc-shaped edge B1 adjacent to the display area AA and a second arc-shaped edge B2 disposed opposite to the first arc-shaped edge B1. In the irregularly-shaped area NA1, the second touch pads P2 are arc-shaped and disposed between the first arc edge B1 and the second arc edge B2.

Optionally, in one embodiment, the irregularly-shaped areas NA1 are on the left and right sides of the step area NA0 and can be regarded as areas where a lower left corner and a lower right corner of the display panel are located. Optionally, the irregularly-shaped area NA1 can be regarded as obtained by cutting original right-angled corners of the display panel of a rectangular structure to form chamfered corners. In one embodiment, the irregularly-shaped area NA1 includes a first arc-shaped edge B1 and a second arc-shaped edge B2 disposed opposite to the first arc-shaped edge B1. The first arc-shaped edge B1 is adjacent to the display area AA, and the second arc-shaped edge B2 can be regarded as a partial edge of a border of the display panel. On the array substrate 10, the second touch pads P2 are disposed in an arc between the first arc edge B1 and the second arc edge B2. Optionally, an arc-shaped arrangement trend of the plurality of second touch pads P2 is adapted to an extension trend of the first arc-shaped edge B1 and the second arc-shaped edge B2. For example, arc centers of the disposed first arc edge B1, the second arc edge B2 and the second touch pads P2 are all on a side of the second arc edge B2 facing the display area AA. In the irregularly-shaped area NA1, the second touch pads P2 adopt an arc-shaped arrangement that is compatible with the extension trend of the first arc-shaped edge B1 and the second arc-shaped edge B2, which is conducive to rationally utilizing a space of the irregularly-shaped area NA1 and meet a space requirement of the second touch pads P2.

Figure 6:
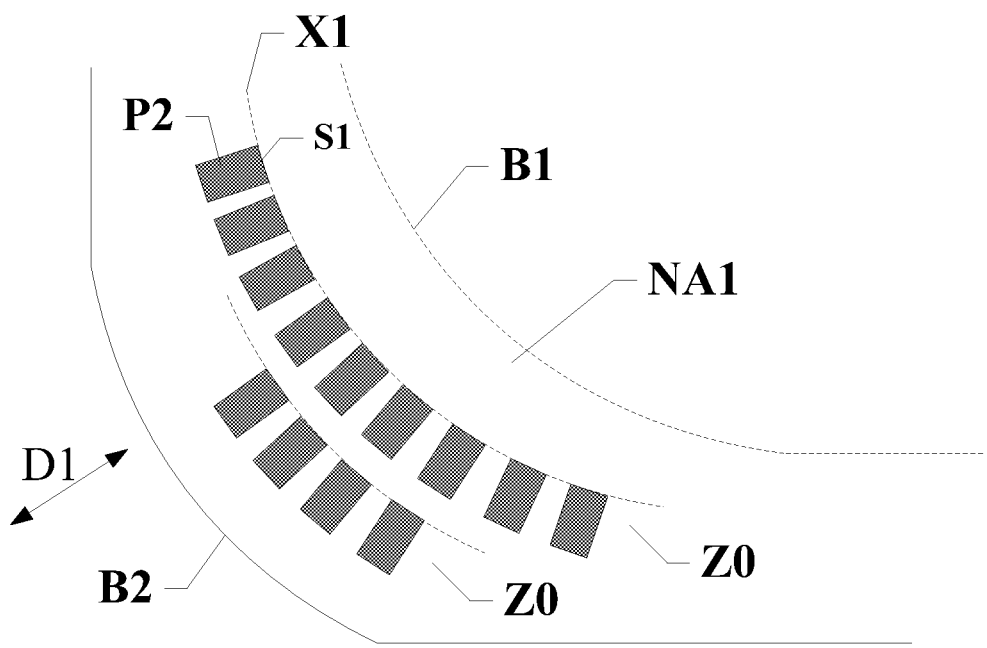
FIG. 6 illustrates another arrangement diagram of second touch pads in an irregularly-shaped area of a display panel according to one embodiment of the present disclosure.

FIG. 6 illustrates another arrangement diagram of second touch pads P2 in the irregularly-shaped area NA1 of the display panel according to one embodiment of the present disclosure. It can be understood that the embodiment of FIG. 6 only illustrates an arrangement structure of the second touch pads P2 in the irregularly-shaped area NA1 and does not limit an actual number and sizes of the second touch pads P2 in the irregularly-shaped area NA1. A first reference arc line X1 introduced in the embodiment shown in FIG. 6 is a dummy line for reference and does not represent an actual structure in the display panel.

Referring to FIG. 2, FIG. 5, and FIG. 6, in one optional embodiment, the irregularly-shaped area NA1 includes the first reference arc X1 between the first arc edge B1 and the second arc edge B2. The plurality of second touch pads P2 form at least one pad group Z0, and first edges S1 of a plurality of second touch pads P2 in a same pad group Z0 are disposed along a same side of the first reference arc X1. Each first edge S1 is tangent to the first reference arc X1.

Optionally, a curved shape of the first reference arc X1 between the first curved edge B1 and the second curved edge B2 is adapted to curved shapes of the first curved edge B1 and the second curved edge B2. That is, centers of the first arc edge B1, the second arc edge B2 and the first reference arc X1 are all on the side of the second arc edge B2 facing the display area AA. In one embodiment, a plurality of second touch pads P2 disposed along the same first reference arc X1 forms a pad group Z0. It can be understood that number and size of the second touch pads P2 corresponding to a same pad group Z0 are only for illustration, which are not specifically limited herein. It should be noted that the plurality of second touch pads P2 in the same pad group Z0 are all on a same side of the same first reference arc X1. In the embodiment, the plurality of second touch pads P2 in the same pad group Z0 are located on the side of the first reference arc X1 away from the first arc edge B1. Optionally, a shape and a size of each second touch pad P2 in a same pad group Z0 are same. In the embodiment, a second touch pad P2 having a rectangular structure is taken as an example. For example, a first edge S1 of the second touch pad P2 refers to a short side of the second touch pad P2 having a rectangular structure. In the embodiment, in a same pad group Z0, an arrangement of the second touch pads P2 is embodied in that, while the second touch pads P2 are disposed along the first reference arc X1, a first edge S1 of each second touch pad P2 is tangent to the first reference arc X1. In the embodiment, the arrangement of the second touch pads P2 in a same pad group Z0 is called a rotational arrangement. In the rotational arrangement, two adjacent second touch pads P2 in a same pad group Z0 can be separated by a minimum distance on a premise of ensuring mutual insulation. When a length of the first reference arc X1 is constant, the same first reference arc X1 can correspond to a larger number of second touch pads P2. Therefore, a space in the irregularly-shaped area NA1 can be fully utilized to dispose the second touch pads P2 and a forming process of the second touch pad P2 can be simplified at a same time.

It should be noted that FIG. 5 only illustrates a scheme of disposing a same pad group Z0 in a same irregularly-shaped area NA1. In some other embodiments, if number of the second touch pads P2 is large, two or more sets of pad groups Z0 may also be disposed in a same irregularly-shaped area NA1. For example, referring to FIG. 6, in one embodiment, the irregularly-shaped area NA1 including two pad groups Z0 is taken as an example for illustration. Optionally, the two pad groups Z0 are disposed between the first arc edge B1 and the second arc edge B2 along a direction in which the second arc edge B2 is disposed opposite to the first arc edge B1. Optionally, number of the second touch pads P2 included in the pad group Z0 adjacent to the first arc edge B1 is greater than number of the second touch pads P2 included in the pad group Z0 adjacent to the second arc edge B2. Optionally, the two pad groups Z0 correspond to two different first reference arcs X1 respectively, and the two first reference arcs X1 have a same or substantially a same bending shape, thereby realizing rational utilization of a space in the irregularly-shaped area NA1.

Figure 7:
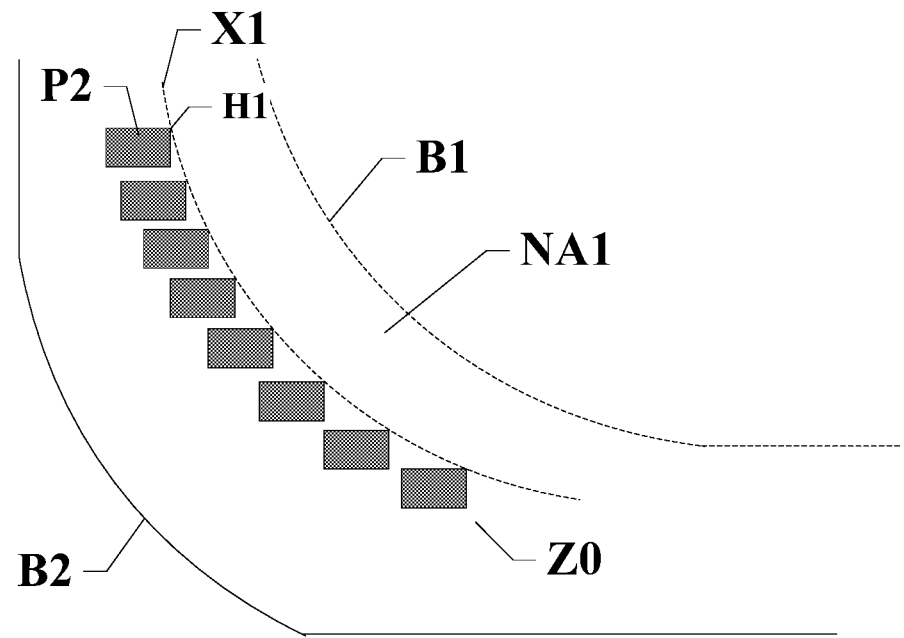
FIG. 7 illustrates another arrangement diagram of second touch pads in an irregularly-shaped area of a display panel according to one embodiment of the present disclosure.

FIG. 7 illustrates another arrangement diagram of the second touch pads P2 in the irregularly-shaped area NA1 of the display panel according to one embodiment of the present disclosure. It can be understood that the embodiment of FIG. 7 only illustrates an arrangement structure of the second touch pads P2 in the irregularly-shaped area NA1 and does not limit an actual number and sizes of the second touch pads P2 in the irregularly-shaped area NA1.

Referring to FIG. 2 and FIG. 7, in one optional embodiment, the irregularly-shaped area NA1 includes the first reference arc X1 between the first arc edge B1 and the second arc edge B2. A plurality of second touch pads P2 form at least one pad group Z0, and the plurality of second touch pads P2 in a same pad group Z0 are disposed in parallel along a same side of the first reference arc X1.

Optionally, in one embodiment, the curved shape of the first reference arc X1 between the first curved edge B1 and the second curved edge B2 is adapted to curved shapes of the first curved edge B1 and the second curved edge B2. That is, centers of the first arc edge B1, the second arc edge B2 and the first reference arc X1 are all on the side of the second arc edge B2 facing the display area AA. In the embodiment, a plurality of second touch pads P2 disposed along a same first reference arc X1 form a pad group Z0. It can be understood that number and sizes of the second touch pads P2 corresponding to the same pad group Z0 are only for illustration, which are not specifically limited herein. It should be noted that the plurality of second touch pads P2 in a same pad group Z0 are all on a same side of a same first reference arc In the embodiment, the plurality of second touch pads P2 in the same pad group Z0 are on a side of the first reference arc X1 away from the first arc edge B1. Optionally, shapes and sizes of the second touch pads P2 in the same pad group Z0 are same. In the embodiment, the second touch pad P2 with a rectangular structure is taken as an example for illustration.

A difference between the embodiment shown in FIG. 7 and the embodiment shown in FIG. 5 and FIG. 6 is that a relative positional relationship between the second touch pads P2 in the pad group Z0 and the first reference arc X1 is different. The first edges S1 of the second touch pads P2 in the embodiments shown in FIGS. 5 and 6 are tangent to the first reference arc X1. In the embodiment shown in FIG. 7, the first edges S1 of the second touch pads P2 are not tangent to the first reference arc X1. Specifically, the second touch pads P2 in a same pad group Z0 in the embodiment shown in FIG. 7 are disposed in parallel. When shapes of the second touch pads P2 are rectangles, long sides and short sides of the second touch pads P2 in a same pad group Z0 are parallel respectively. The above arrangement can be called a stacking arrangement. Assuming that the second touch pad P2 of a rectangular structure includes a first right-angled corner portion H1, optionally, endpoints of first right-angled corners H1 of the second touch pads P2 in a same pad group Z0 are all in contact with the first reference arc That is, shapes of connection lines between the endpoints of the first right-angled corner portions H1 of the second touch pads P2 in the same pad group Z0 are similar to the shape of the first reference arc X1. When the second touch pads P2 are disposed in a stacking arrangement, long and short sides of each second touch pad P2 are parallel to long and short straight sides of the display panel respectively and the arrangement is relatively neat, which is conducive to simplifying a forming difficulty of the second touch pads P2 in the irregularly-shaped area NA1.

Figure 8:
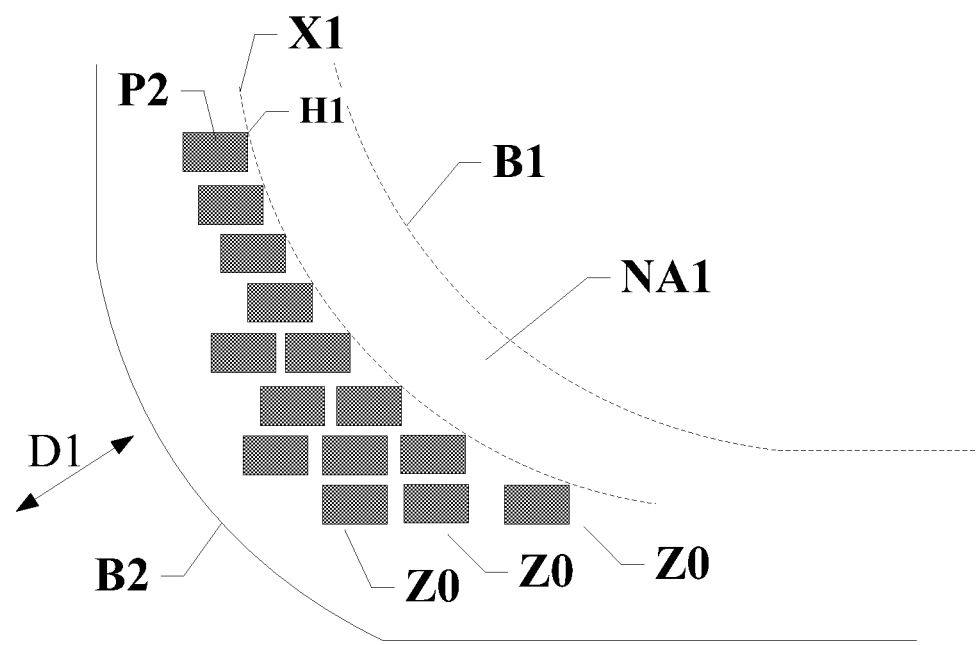
FIG. 8 illustrates another arrangement diagram of second touch pads in an irregularly-shaped area of a display panel according to one embodiment of the present disclosure.

It should be noted that FIG. 7 only illustrates a scheme of disposing a same pad group Z0 in a same irregularly-shaped area NA1. In some other embodiments, if number of the second touch pads P2 is large, two or more sets of pad groups Z0 may also be disposed in a same irregularly-shaped area NA1. For example, referring to FIG. 8. FIG. 8 illustrates another arrangement diagram of the second touch pads P2 in an irregularly-shaped area NA1 of the display panel according to one embodiment of the present disclosure. In the embodiment, the irregularly-shaped area NA1 including three pad groups Z0 is taken as an example for illustration. Optionally, the three pad groups Z0 are disposed between the first arc edge B1 and the second arc edge B2 along the direction in which the first arc edge B1 is disposed opposite to the second arc edge B2. Optionally, number of the second touch pads P2 included in the pad group Z0 adjacent to the first arc edge B1 is greater than number of the second touch pads P2 included in the pad group Z0 adjacent to the second arc edge B2. Number of the second touch pads P2 included in the pad group Z0 in a middle area is between the number of the second touch pads P2 included in the pad group Z0 adjacent to the first arc edge B1 and the number of the second touch pads P2 included in the pad group Z0 adjacent to the second arc edge B2. Optionally, the three pad groups Z0 correspond to three different first reference arcs X1 respectively, and the three first reference arcs X1 have a same or substantially a same curved shape, thereby realizing rational utilization of a space in the irregularly-shaped area NA1.

Referring to FIG. 6 and FIG. 8, in one optional embodiment, a plurality of second touch pads P2 form at least two pad groups Z0. In the irregularly-shaped area NA1, at least two pad groups Z0 are disposed along a first direction D1, and the first direction D1 is a direction in which the first arc-shaped edge B1 points to the second arc-shaped edge B2. Alternatively, the first direction D1 is a direction in which the second arc-shaped edge B2 points to the first arc-shaped edge B1.

Specifically, the embodiments shown in FIG. 6 and FIG. 8 respectively show a scheme of disposing at least two pad groups Z0 in the irregularly-shaped area NA1. In the embodiment shown in FIG. 6, two pad groups Z0 are disposed in the irregularly-shaped area NA1, and in the embodiment of FIG. 8, three pad groups Z0 are disposed in the irregularly-shaped area NA1. When the at least two pad groups Z0 are disposed in a same irregularly-shaped area NA1, the at least two pad groups Z0 in a same irregularly-shaped area NA1 are disposed along the first direction D1, i.e., are disposed along an arrangement direction of the first arc-shaped edge B1 and the second arc-shaped edge B2, which is equivalent to being disposed in accordance with the shape of the irregularly-shaped area NA1. The arrangement can make full use of a space of the irregularly-shaped area NA1 and is also conducive to meeting a size requirement of the second touch pad P2 for an arrangement space at a same time.

Referring to FIG. 6 and FIG. 8, in one optional embodiment, in the irregularly-shaped area NA1, arrangements of the second touch pads P2 in different pad groups Z0 are same.

Specifically, in the irregularly-shaped area NA1 shown in the embodiment of FIG. 6, the second touch pads P2 in the two ses of pad groups Z0 are disposed in a rotational arrangement. That is, the first edges S1 of the second touch pads P2 in different pad groups Z0 are all tangent to a corresponding first reference arc X1. In the irregularly-shaped area NA1 shown in the embodiment of FIG. 8, the second touch pads P2 in the three pad groups Z0 are disposed in a stacking arrangement, so that long sides of the second touch pads P2 are respectively parallel, and short sides of the second touch pads P2 are also parallel. When all the pad groups Z0 in the same irregularly-shaped area NA1 are laid out in a same arrangement, there is no need to introduce different arrangements for the second touch pads P2 in different pad groups Z0, which is conductive to simplifying a forming process of each pad group Z0 in the same irregularly-shaped area NA1, and further improving overall production efficiency of the display panel.

A shape of a uniform second touch pad P2 in the above embodiment being a rectangle is taken as an example for illustration. Actual shapes of the second touch pads P2 are not limited herein. In one optional embodiment, shapes of the second touch pads P2 are at least one of a rectangle, a trapezoid, and a circle.

Figure 9:
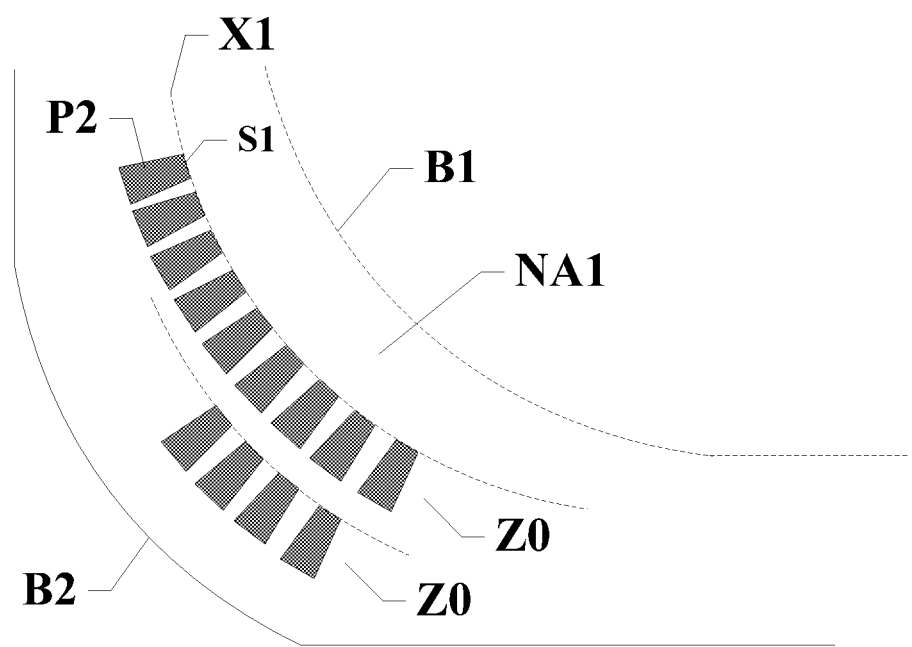
FIG. 9 illustrates another arrangement diagram of second touch pads in an irregularly-shaped area of a display panel according to one embodiment of the present disclosure.

Optionally, the stacking arrangement mentioned in the embodiments of FIG. 7 and FIG. 8 is especially for the second touch pads P2 of a rectangular structure. When shapes of the second touch pads P2 are circles, optionally, the second touch pads of circular structures are tangent to the first reference arc. Optionally, when the second touch pads P2 adopts the structure of rotational arrangement, shapes of the second touch pads P2 can also be embodied as trapezoids. For example, referring to FIG. 9, FIG. 9 illustrates another arrangement diagram of the second touch pads P2 in the irregularly-shaped area NA1 of the display panel according to one embodiment of the present disclosure. In the embodiment, shapes of the second touch pads P2 are trapezoids. Optionally, in a same pad group Z0, an upper base (a base with a relatively short length) of the trapezoid is tangent to the first reference arc X1. When the second touch pads P2 adopt a trapezoidal structure and are disposed in a rotational arrangement, it is conducive to reducing a space between two adjacent second touch pads P2, thereby saving a space of the irregularly-shaped area NA1 to dispose more second touch pads P2 to meet a setting requirement of a larger number of second touch pads P2. Alternatively, other circuit structures may also be provided in the saved space, so that the space of the irregularly-shaped area NA1 can be used more reasonably.

In one optional embodiment, impedances of the second touch pads P2 are equal.

Specifically, to make the impedances of the second touch pads P2 equal, the second touch pads P2 in a same irregularly-shaped area NA1 can be formed with a same shape, material, and size, which not only ensures a same impedance, but also facilitates simplification of a forming process. In addition, when the impedances of the second touch pads P2 are set to be equal, it is conducive to avoiding different voltage drops caused by different impedances, and further avoiding reducing a poor signal accuracy caused by different voltage drops, which is conducive to improving accuracy of a touch signal.

Optionally, referring to FIG. 3, to further improve impedance uniformity, impedances of all the first touch pads P1 can be set to be same. Impedances of conductors 60 connecting the first touch pads P1 and the second touch pads P2 can also be set to be same.

Figure 10:
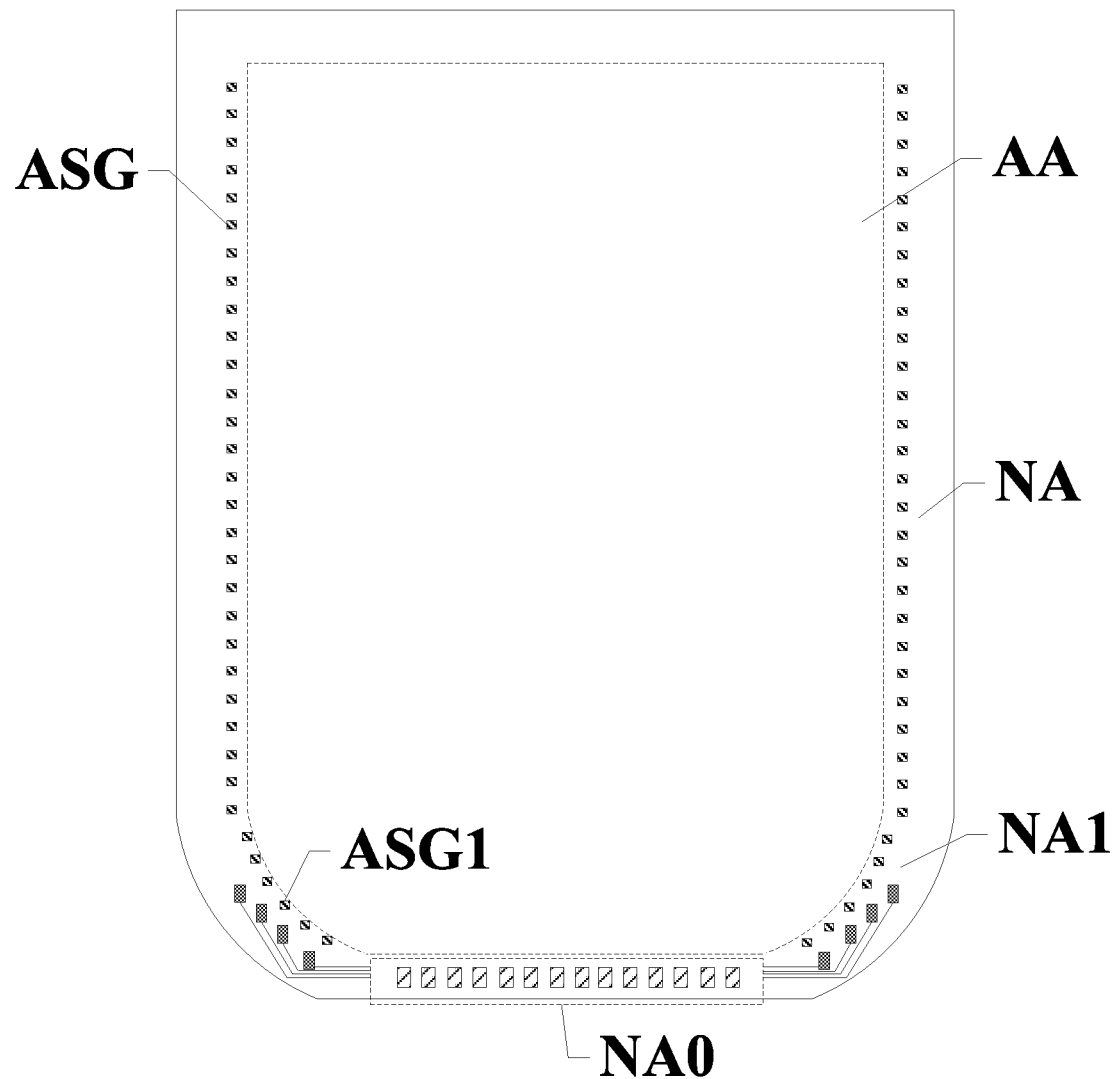
FIG. 10 illustrates another structural view of a display panel showing an arrangement structure of shift registers in an irregularly-shaped area according to one embodiment of the present disclosure.
Figure 11:
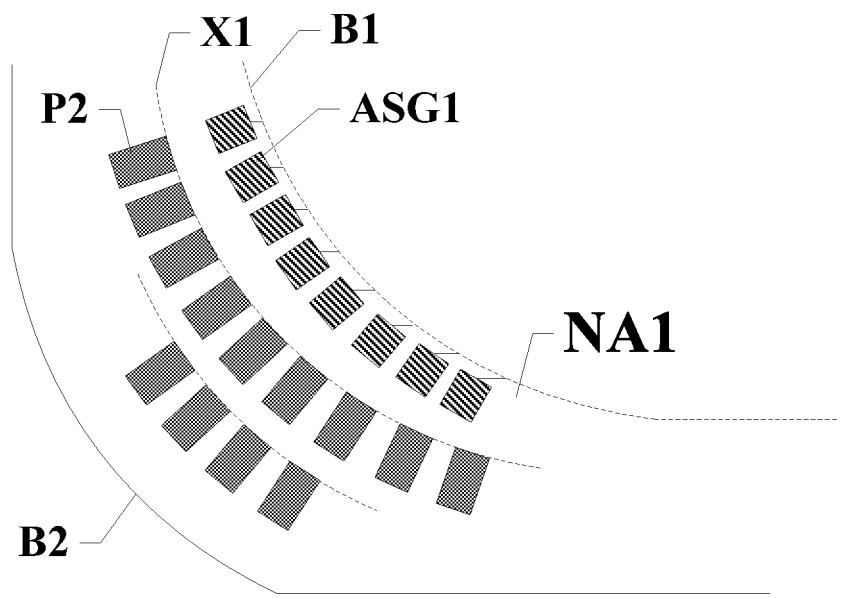
FIG. 11 illustrates an arrangement diagram of second touch pads and shift registers in an irregularly-shaped area of a display panel according to one embodiment of the present disclosure.

FIG. 10 illustrates another structural view of a display panel showing an arrangement structure of shift registers in an irregularly-shaped area NA1 according to one embodiment of the present disclosure. FIG. 11 illustrates an arrangement diagram of second touch pads P2 and shift registers in the irregularly-shaped area NA1 of the display panel according to one embodiment of the present disclosure. It should be noted that FIG. 10 only illustrates an arrangement structure of shift registers ASG in the display panel, and does not limit actual shapes, number, and sizes of the shift registers ASG. It should also be noted that the non-display area NA of the display panel is usually provided with a gate drive circuit and a light emission control circuit that provide signals for pixel drive circuits in the display area AA. For example, the shift registers in the embodiment shown in FIG. 10 can be shift registers in a gate driving circuit or a shift register in a light-emitting control circuit, which is not specifically limited herein.

Referring to FIG. 10 and FIG. 11, in one optional embodiment, the array substrate 10 includes a plurality of cascaded shift registers ASG in the non-display area NA of the array substrate 10. At least part of the shift registers is in the irregularly-shaped area NA1. The second touch pad P2 is on a side of the shift registers ASG away from the display area AA of the array substrate 10.

Specifically, in the embodiment, the shift registers ASG in the non-display area NA are electrically connected to the circuits in the display area AA through connection lines. That is, connection lines are disposed between the shift registers ASG and the display area AA. In the irregularly-shaped area NA1, the shift registers ASG are disposed between the second touch pads P2 and the first arc edge B1. That is, the shift registers ASG are disposed adjacent to the first arc edge B1, so that distances between the shift registers ASG and the display area AA can be reduced, thereby reducing lengths of the connection lines between the shift registers ASG and the display area AA. In addition, if the second touch pads P2 are disposed between the shift registers ASG and the first arc edge B1, the connection lines between the shift registers ASG and the first arc edge B1 affect the arrangement of the second touch pads P2. Therefore, the shift registers ASG are disposed close to the first arc edge B1, and the second touch pads P2 are disposed on a side of the shift registers ASG away from the first arc edge B1, which not only facilitates electrical connections between the shift registers ASG and lines in the display area AA, but also reserves a sufficient layout space for the second touch pad P2, to realize narrow border design of the display panel.

Referring to FIG. 10 and FIG. 11, in one optional embodiment, the irregularly-shaped area NA1 includes the first arc edge B1 adjacent to the display area AA. The shift registers in the irregularly-shaped area NA1 are first shift registers ASG1 disposed along the first arc edge B1.

Specifically, assuming that the shift registers in the irregularly-shaped area NA1 are the first shift registers ASG1, when the first shift registers ASG1 in the irregularly-shaped area NA1 are disposed on a side of the second touch pads P2 facing the first arc edge B1, in the embodiment, the first shift registers ASG1 are further confined to be disposed along the first arc edge B1, so that a space adjacent to the first arc-shaped edge B1 in the irregularly-shaped area NA1 can be effectively utilized, which is conducive to improving effective utilization of space in the irregularly-shaped area NA1.

Figure 12:
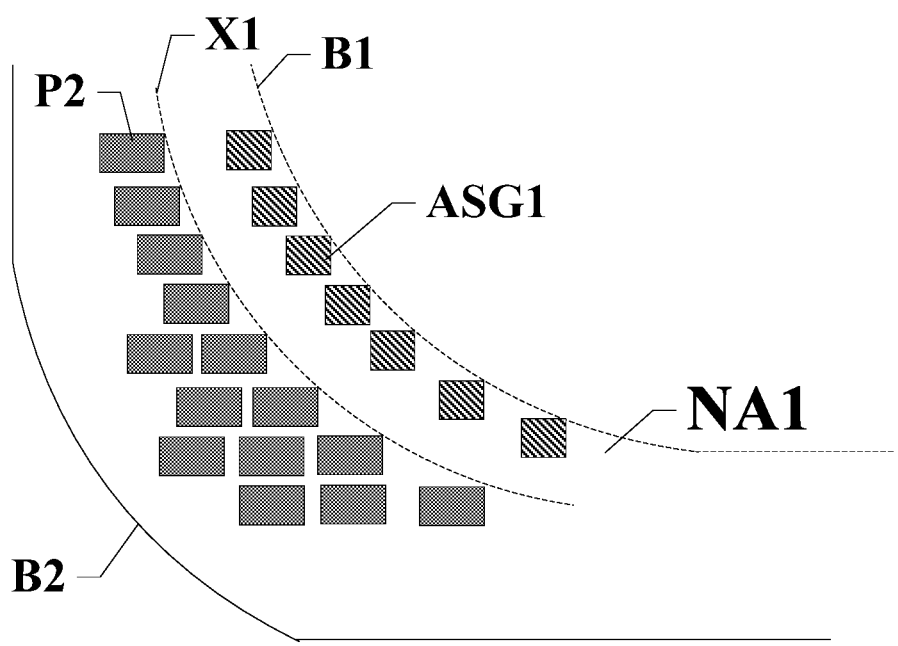
FIG. 12 illustrates another arrangement diagram of second touch pads and shift registers in an irregularly-shaped area of a display panel according to one embodiment of the present disclosure.

FIG. 12 illustrates another arrangement diagram of the second touch pads P2 and the shift registers in the irregularly-shaped area NA1 of the display panel according to one embodiment of the present disclosure. A difference between the embodiment of FIG. 12 and the embodiment of FIG. 11 is that arrangements of the second touch pads P2 and the shift registers are different.

Referring to FIG. 11 and FIG. 12, in one optional embodiment, in the irregularly-shaped area NA1, an arrangement of the first shift registers ASG1 is same as the arrangement of the second touch pads P2.

Specifically, in the embodiment shown in FIG. 11, the arrangement of the first shift registers ASG1 and the arrangement of the second touch pads P2 are same, which means that the first shift registers ASG1 are rotationally disposed along the first arc edge B1, and the second touch pads P2 are rotationally arranged along the first reference arc X1, that is, both the first shift registers ASG1 and the second touch pads P2 are rotationally arranged structures. When both the first shift registers ASG1 and the second touch pads P2 adopt rotational arrangement structures, it is conducive to fully and reasonably utilizing the space of the irregularly-shaped area NA1, so that more numbers of the first shift registers ASG1 and the second touch pad P2 that can be set in the irregularly-shaped area NA1 of a same area. Moreover, when both the first shift registers ASG1 and the second touch pads P2 are disposed in a rotational arrangement, it is also conducive to simplifying an overall forming process of the first shift registers ASG1 and the second touch pads P2.

In the embodiment shown in FIG. 12, the arrangement of the first shift registers ASG1 and the arrangement of the second touch pads P2 are same, which means that the first shift registers ASG1 are stacked and disposed along the first arc edge B1, and the second touch pads P2 are stacked and disposed along the first reference arc X1. That is, the first shift registers ASG1 and the second touch pads P2 are stacked arrangement structures. When both the first shift registers ASG1 and the second touch pads P2 adopt the stacking arrangement structures, the first shift registers ASG1 and the second touch pad P2 can be disposed in an adaptive manner and make full use of the space of the irregularly-shaped area NA1. Moreover, when the first shift registers ASG1 and the second touch pads P2 are disposed in a rotational arrangement, it is also conducive to simplifying an overall forming process of the first shift registers ASG1 and the second touch pads P2.

Referring to FIG. 2 and FIG. 10, in one optional embodiment, the non-display area NA includes two irregularly-shaped areas NA1 adjacent to the step area NA0. Along an arrangement direction of the bonding pads, the two irregularly-shaped areas NA1 are on two sides of the step area NA0 respectively. Each of the two irregularly-shaped areas NA1 is provided with the second touch pads P2.

Specifically, in the embodiment, to improve an appearance of the display panel 100, corresponding irregularly-shaped areas NA1 are disposed on two sides of the step area NA0. Optionally, the irregularly-shaped areas NA1 on two sides of the step area NA0 are respectively at the lower left corner and the lower right corner of the display panel, and the two irregularly-shaped areas NA1 are symmetrically distributed. In the embodiment, the second touch pads P2 are disposed in the two irregularly-shaped areas NA1. That is, part of the second touch pads P2 electrically connected to the touch electrode layer TO is disposed in the shaped area NA1 on the left, and another part of the second touch pads P2 connected to the touch electrode layer TO Set in the irregularly-shaped area NA1 is disposed in the shaped area NA1 on the right, which is conducive to avoiding an abnormal phenomena such as short circuit due to excessive number of the second touch pads P2 in a single irregularly-shaped area NA1. When the second touch pads P2 are disposed in two irregularly-shaped areas NA1 respectively, it is conducive to ensuring that adjacent second touch pads P2 in each of the irregularly-shaped areas NA1 maintain a certain interval, to ensure an accuracy and a stability of a touch signal transmission. It should be noted that the second touch pads P2 in the two irregularly-shaped areas NA1 in FIG. 2 are for illustration only, and do not represent an actual number, actual shapes, and actual sizes.

Referring to FIG. 2 and FIG. 10, in one optional embodiment, the second touch pads P2 in the two irregularly-shaped areas NA1 are disposed symmetrically.

Specifically, when the second touch pads P2 are disposed in the two irregularly-shaped areas NA1 on two sides of the step area NA0, in the embodiment, numbers of the second touch pads P2 disposed in the two irregularly-shaped areas NA1 are set to be same. That is, one half of the second touch pads P2 are disposed in one of the irregularly-shaped areas NA1, and the other half of the second touch pads P2 are disposed in the other irregularly-shaped area NA1. The second touch pads P2 are evenly disposed in the two irregularly-shaped areas NA1, and the second touch pads P2 in the two irregularly-shaped areas NA1 are disposed symmetrically. Connection leads 30 between the touch electrode layers T0 and the second touch pads P2 in the two irregularly-shaped areas NA1 can also be electrically connected in a symmetrical arrangement, which is conducive to simplifying a wiring complexity in the display panel. At a same time, a symmetrical distribution of the second touch pads P2 in the two irregularly-shaped areas NA1 is also conducive to simplifying a forming process of the second touch pads P2 in the irregularly-shaped areas NA1.

Figure 13:
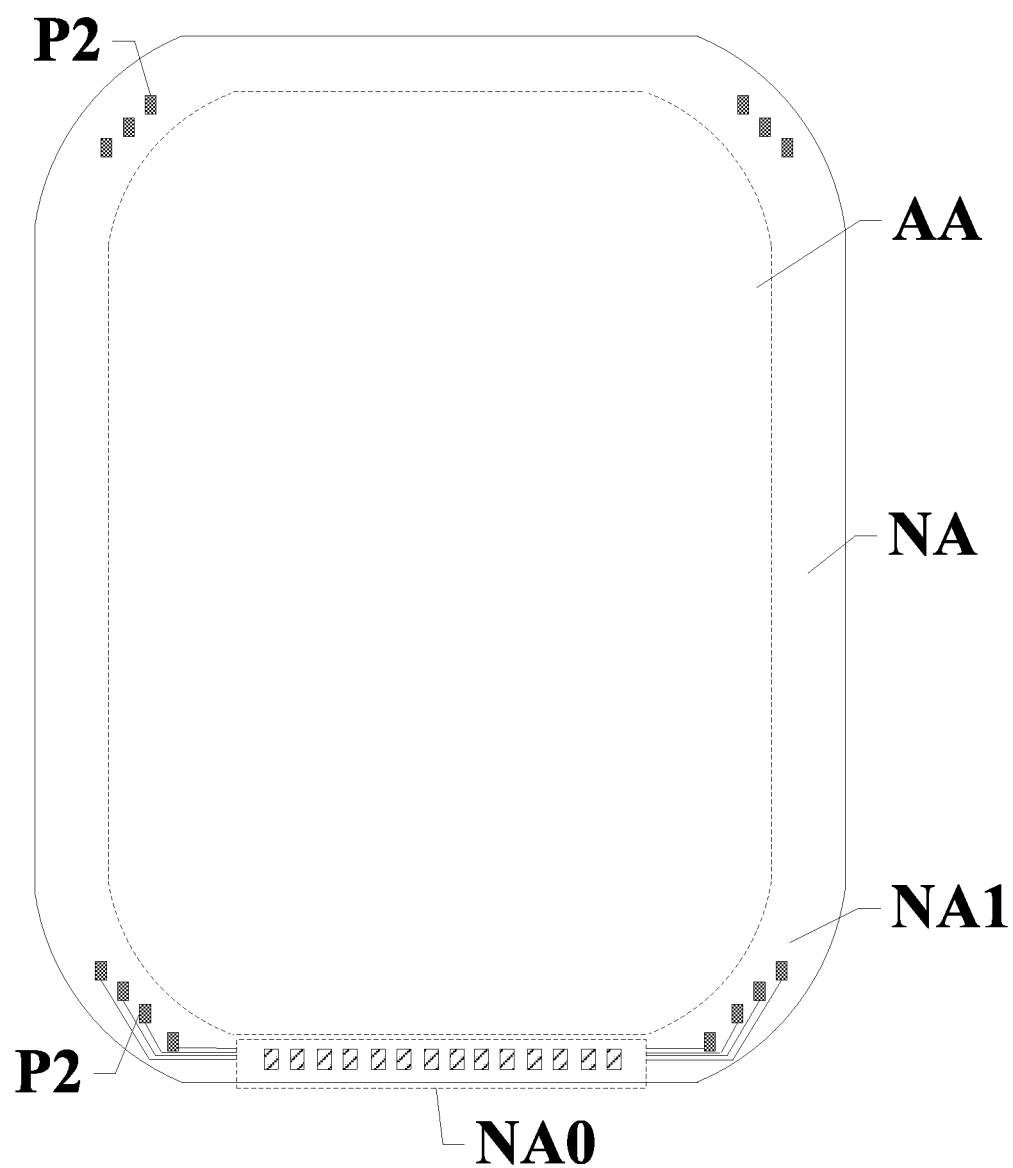
FIG. 13 illustrates another structural view of a display panel according to one embodiment of the present disclosure.

FIG. 13 illustrates another structural view of a display panel according to one embodiment of the present disclosure. The embodiment shows a solution in which an irregularly-shaped area NA1 is respectively disposed at each of four corners of the display panel.

Referring to FIG. 13, in one optional embodiment, the non-display area NA includes four irregularly-shaped areas NA1 at four corners of the display panel respectively. Each of the irregularly-shaped areas NA1 is provided with second touch pads P2.

Referring to FIG. 3, FIG. 4 and FIG. 13, when the four corners of the display panel are provided with irregularly-shaped areas NA1, in the embodiment, the second touch pads P2 are disposed in each of the irregularly-shaped areas NA1, which is equivalent to disposing a plurality of second touch pads P2 connected to the touch electrode layers T0 in the four irregularly-shaped areas NA1, thereby effectively reducing number of the second touch pads P2 included in a single shaped area NA1. The above solution is especially suitable for a situation where number of the second touch pads P2 is large. Optionally, since the second touch pads P2 in the irregularly-shaped areas NA1 at an upper left corner and an upper right corner of the display panel are far away from the bonding pads, the second touch pads P2 can be electrically connected to the bonding pads by wirings from a side border or wirings from the display area AA. Optionally, number of the second touch pads P2 included in the irregularly-shaped areas NA1 at the upper left corner and the upper right corner of the display panel is less than number of second touch pads P2 included in the irregularly-shaped areas NA1 at a lower left corner and a lower right corner of the display panel. Therefore, only a small number of the second touch pads P2 need longer wires to be electrically connected to the bonding pads, which is conducive to simplifying a wiring complexity when the second touch pads P2 are disposed in the four irregularly-shaped areas NA1.

Figure 14:
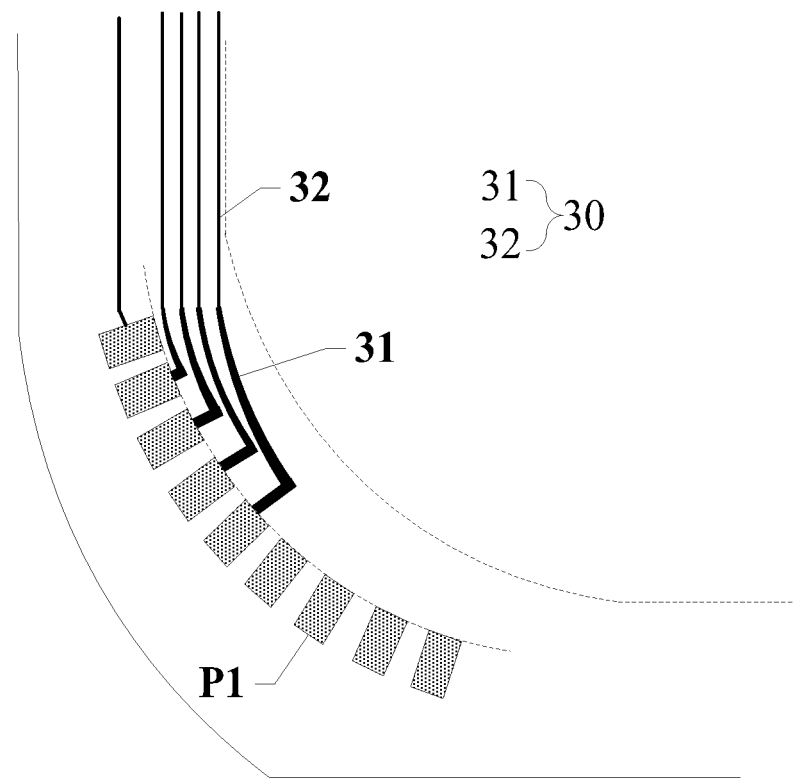
FIG. 14 illustrates a connection diagram between connection leads and first touch pads according to one embodiment of the present disclosure.

FIG. 14 illustrates a connection diagram between the connection leads 30 and the first touch pads P1 according to one embodiment of the present disclosure. It should be noted that FIG. 14 only illustrates the connection leads 30 connected to part of the first touch pads P1. The first touch pads P1 that are not shown to be connected to the connection leads 30 also have corresponding connection leads 30 electrically connected to the first touch pads P1.

In one optional embodiment, referring to FIG. 1 to FIG. 4 and FIG. 14, on the cover plate 20, the first touch pads P1 are electrically connected to the touch electrode layers T0 through the connection leads 30. A connection lead 30 includes a first line segment 31 in the irregularly-shaped area NA1 and a second line segment 32 outside the irregularly-shaped area NA1. A line width of the first line segment 31 is larger than a line width of the second line segment 32. Optionally, reference may be made to FIG. 4 for a connection relationship between the first touch pads P1 and the touch electrode layers T0.

Specifically, since the connection leads 30 are drawn out from the touch electrode layers T0 and extend into the irregularly-shaped area NA1 after passing through the display area AA or border areas, the connection leads 30 are electrically connected to the first touch pads P1 in the irregularly-shaped area NA1. In one embodiment, part of a same connection lead 30 in the irregularly-shaped area NA1 is the first line segment 31, and part outside the irregularly-shaped area NA1 is the second line segment 32. The first line segment 31 is electrically connected to the second line segment 32. Considering that an impedance of a connection lead 30 directly affects a transmission rate and a transmission accuracy of a touch signal, the greater the impedance of the connection lead 30, the greater an impact on the transmission rate and the transmission accuracy of the touch signal. Increasing a line width of the connection lead 30 can reduce the impedance of the connection lead 30 to a certain extent. Optionally, only the first touch pads P1 and corresponding first line segments 31 of the connection leads 30 are disposed in the irregularly-shaped area NA1 corresponding to the cover plate 20, so the space in the irregularly-shaped area NA1 is relatively abundant, which can provide a certain growth space for line widths of the first line segments 31 of the connection leads 30 in the irregularly-shaped area NA1, so that the line widths of the first line segments 31 are larger than line widths of the second line segment 32, thereby helping reduce an overall impedance of the corresponding connection leads 30, and improve a transmission rate and a transmission accuracy of a touch signal to a certain extent.

Referring to FIG. 14, optionally, a line width of the first line segment 31 gradually changes. Specifically, from an end electrically connected to the second line segment 32 to an end electrically connected to the first touch pad P1, the line width of the first line segment 31 gradually increases. When the line width of the first line segment 31 changes gradually, a resistance of the first line segment 31 also gradually changes, and a magnitude of a signal transmitted on the first line segment 31 also gradually changes. When a static electricity acts on the first line segment 31 and the static electricity is transmitted from the first line segment 31 to the first touch pad P1, a magnitude of the static electricity also gradually changes. In the embodiment, a line width of one end of the first line segment 31 that is electrically connected to the first touch pad P1 is largest, which effectively avoids or reduces a phenomenon of damage caused by a static electricity due to a sudden change in impedance at a position where the first line segment 31 is electrically connected to a first touch pad P, thereby helping improve antistatic performance of the display panel.

It should be noted that FIG. 14 only illustrates an arrangement of the connection leads of one irregularly-shaped area in the display panel. When the display panel includes a plurality of irregularly-shaped areas, for other arrangements of the connection leads in the irregularly-shaped areas provided with the first touch pads, reference may be made to an arrangement of the embodiment of FIG. 14. That is, a line width of the first line segment in the irregularly-shaped area is increased to reduce an impedance, thereby improving a transmission rate and a transmission accuracy of a touch signal in the connection leads corresponding to each irregularly-shaped area and the first touch pads.

Figure 15:
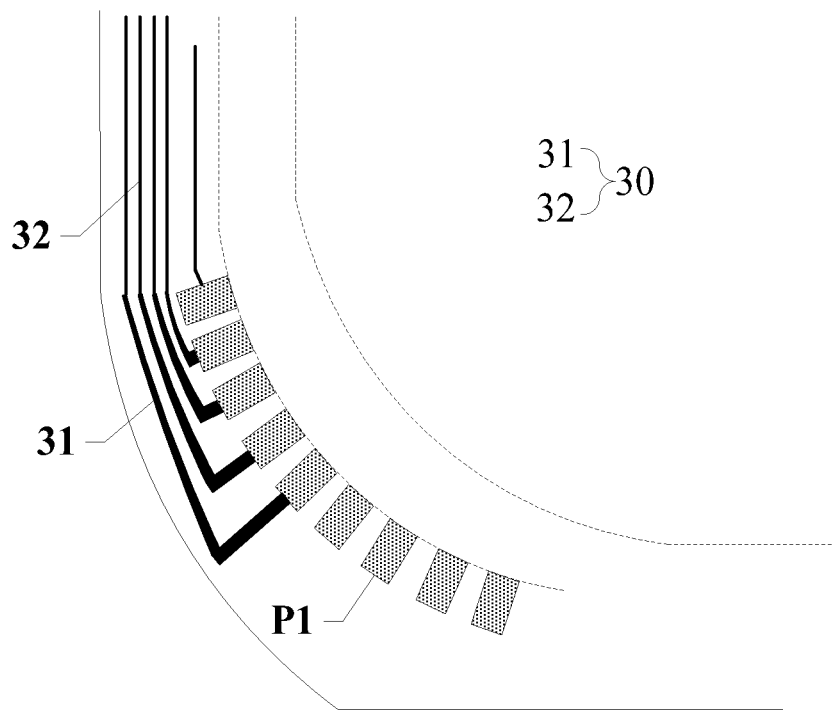
FIG. 15 illustrates another connection diagram between connection leads and first touch pads according to one embodiment of the present disclosure.

It should also be noted that one embodiment shown in FIG. 14 shows a solution in which the first line segments 31 are on a side of the first touch pads P1 facing the display area. In some other embodiments, the first line segments 31 can also be disposed on a side of the first touch pads P1 away from the display area. For example, referring to FIG. 15, since devices such as shift registers are also disposed between the first touch pads P1 and the display area, when the first line segments 31 are disposed on the side of the first touch pads P1 away from the display area, a space between the first touch pads P1 and the display area can be saved to meet a space requirement of devices such as shift registers. FIG. 15 illustrates another connection diagram between the connection leads and the first touch pads according to one embodiment of the present disclosure.

In some other embodiments, according to actual needs, a certain number of first line segments can also be disposed on a side of the first touch pads close to the display area and a side of the first touch pads far from the display area at a same time, which is not limited herein.

Figure 16:
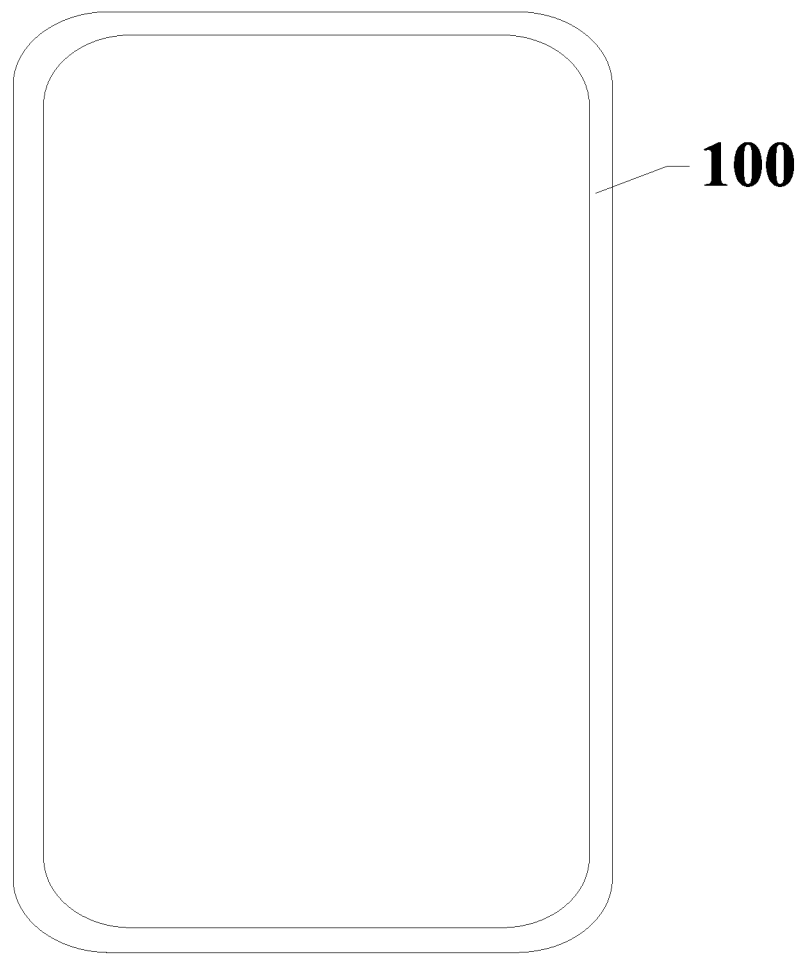
FIG. 16 illustrates a structural view of a display according to one embodiment of the present disclosure.

Based on a same inventive concept, the present disclosure further provides a display device 200. FIG. 16 illustrates a structural view of a display device according to one embodiment of the present disclosure. The display device 200 includes the display panel 100 in any of the above embodiments of the present disclosure. Since in the display panel included in the display device, the first touch pads and the second touch pads connected to the touch electrodes are disposed in the irregularly-shaped area, the second touch pads do not occupy the step area of the array substrate and the space of the left and right borders of the display panel, thereby providing a compressed space for the step area and the left and right border areas of the display panel, which is conducive to realize narrow border design of the in-cell touch display device.

It can be understood that the display device 200 provided in the embodiment may be a computer, a television, a vehicle-mounted display device, or other display device having a display function, which is not specifically limited herein. The display device provided by the embodiment has beneficial effects of the display panel provided by the embodiments of the present disclosure. For details, reference may be made to specific descriptions of the display panel in the above embodiments, which is not repeated herein.

The display panel and the display device provided by the present disclosure achieve at least the following beneficial effects.

In the display panel and the display device provided by the embodiments of the present disclosure, touch electrode layers are introduced when a cover plate faces an array substrate, so that the display panel and the display device have a touch function. A non-display area of the array substrate includes a step area and at least one irregularly-shaped area adjacent to the step area. A plurality of first touch pads electrically connected to the touch electrode layers are disposed in the non-display area of the cover plate, and a plurality of second touch pads electrically connected to bonding pads disposed in an irregularly-shaped area of the array substrate plate. The first touch pads are electrically connected to the second touch pads, thereby realizing electrical connections between the touch electrode layers and the bonding pads. The disclosure introduces that the second touch pads are disposed in the irregularly-shaped area, the touch electrode layers are electrically connected to the bonding pads through the first touch pads and the second touch pads, and the second touch pads are electrically connected to the bonding pads. The second touch pads do not occupy a space of the step area and the left and right borders of the display panel, thereby providing a compressed space for the step area and the left and right border areas of the display panel, which is conducive to realizing narrow border design of the in-cell display panel.

Although some specific embodiments of the present disclosure have been described in detail by way of examples, a person skilled in the art should understand that the above examples are provided for illustration only and are not intended to limit the scope of the present disclosure. A person skilled in the art should understand that modifications may be made to the above embodiments without departing from the scope and spirit of the present disclosure. The scope of the present disclosure is defined by the appended claims.

What is claimed is:

1. A display panel, comprising:
   an array substrate and a cover plate disposed opposite to the array substrate, each of the array substrate and the cover plate including a display area and a non-display area at least partially surrounding the display area, the non-display area of the array substrate including a step area that is provided with bonding pads, and the non-display area of the array substrate including at least one irregularly-shaped area adjacent to the step area;
   touch electrode layers on a side of the cover plate facing the array substrate; and
   a plurality of first touch pads and a plurality of second touch pads disposed opposite to the plurality of first touch pads, a first touch pad being electrically connected to a second touch pad, the first touch pads being in an irregularly-shaped area of the cover plate and being electrically connected to a touch electrode layer, and the second touch pad being in an irregularly-shaped area of the at least one irregularly-shaped area on the array substrate, and being electrically connected to a bonding pad in the step area, wherein:
the array substrate includes a plurality of cascaded shift registers in the non-display area thereof; and
at least part of the plurality of shift registers is in a shaped area, and in the shaped area, the plurality of second touch pads is on a side of the plurality of shift registers away from the display area of the array substrate.

2. The display panel according to claim 1, wherein shapes of second touch pads of the plurality of the second touch pads are at least one of a rectangle, a trapezoid, and a circle.

3. The display panel according to claim 1, wherein an impedance of each of the plurality of second touch pads is equal.

4. The display panel according to claim 1, wherein the non-display area includes four irregularly-shaped areas respectively at four corners of the display panel, and the plurality of second touch pads is disposed in each of the irregularly-shaped areas.

5. The display panel according to claim 1, wherein the plurality of first touch pads is electrically connected to the touch electrode layer through connection leads, a connection lead of the connection leads includes a first line segment in the irregularly-shaped area and a second line segment outside the irregularly-shaped area, and a line width of the first line segment is larger than a line width of the second line segment.

6. The display panel according to claim 1, wherein:
the irregularly-shaped area includes a first arc-shaped edge adjacent to the display area and a second arc-shaped edge disposed opposite to the first arc-shaped edge; and
in the irregularly-shaped area, the plurality of second touch pads is arc-shaped disposed between the first arc-shaped edge and the second arc-shaped edge.

7. The display panel according to claim 6, wherein:
the irregularly-shaped area includes a first reference arc between the first arc edge and the second arc edge; and
the plurality of second touch pads forms at least one pad group, and first edges of the plurality of second touch pads in a same pad group are disposed along a same side of the first reference arc, and each of the first edges is tangent to the first reference arc.

8. The display panel according to claim 6, wherein:
the irregularly-shaped area includes a first reference arc between the first arc edge and the second arc edge; and
the plurality of second touch pads forms at least one pad group, and the plurality of second touch pads in a same pad group is disposed in parallel along a same side of the first reference arc.

9. The display panel according to claim 6, wherein the plurality of the second touch pads form at least two pad groups, in the irregularly-shaped area, the at least two of the pad groups are disposed along a first direction, and the first direction is a direction in which the first arc-shaped edge points to the second arc-shaped edge, or the first direction is a direction in which the second arc-shaped edge points to the first arc-shaped edge.

10. The display panel according to claim 9, wherein in the irregularly-shaped area, the arrangement of the second touch pads in different pad groups is same.

11. The display panel according to claim 1, wherein the irregularly-shaped area includes a first arc-shaped edge adjacent to the display area, shift registers in the irregularly-shaped area are first shift registers disposed along the first arc edge.

12. The display panel according to claim 11, wherein in the irregularly-shaped area, an arrangement of the first shift registers is same as an arrangement of the second touch pads.

13. The display panel according to claim 1, wherein:
the non-display area includes two irregularly-shaped areas adjacent to the step area, and along an arrangement direction of the bonding pads, the two irregularly-shaped areas are respectively on two sides of the step area; and
the plurality of second touch pads is disposed in the two irregularly-shaped areas.

14. The display panel according to claim 13, wherein the plurality of second touch pads in the two irregularly-shaped areas is symmetrically disposed.

15. A display device, comprising a display panel comprising:
an array substrate and a cover plate disposed opposite to the array substrate, each of the array substrate and the cover plate including a display area and a non-display area at least partially surrounding the display area, the non-display area of the array substrate including a step area provided with bonding pads, and the non-display area of the array substrate including at least one irregularly-shaped area adjacent to the step area;
touch electrode layers on a side of the cover plate facing the array substrate; and
a plurality of first touch pads and a plurality of second touch pads disposed opposite to the plurality of first touch pads, a first touch pad being electrically connected to a second touch pad, the first touch pads being in an irregularly-shaped area of the cover plate and being electrically connected to a touch electrode layer, and the second touch pad being in an irregularly-shaped area of the at least one irregularly-shaped area on the array substrate, and being electrically connected to a bonding pad in the step area, wherein:
the array substrate includes a plurality of cascaded shift registers in the non-display area thereof; and
at least part of the plurality of shift registers is in a shaped area, and in the shaped area, the plurality of second touch pads is on a side of the plurality of shift registers away from the display area of the array substrate.

16. A display panel, comprising:
an array substrate and a cover plate disposed opposite to the array substrate, each of the array substrate and the cover plate including a display area and a non-display area at least partially surrounding the display area, the non-display area of the array substrate including a step area that is provided with bonding pads, and the non-display area of the array substrate including at least one irregularly-shaped area adjacent to the step area;
touch electrode layers on a side of the cover plate facing the array substrate; and
a plurality of first touch pads and a plurality of second touch pads disposed opposite to the plurality of first touch pads, a first touch pad being electrically connected to a second touch pad, the first touch pads being in an irregularly-shaped area of the cover plate and being electrically connected to a touch electrode layer, and the second touch pad being in an irregularly-shaped area of the at least one irregularly-shaped area on the array substrate, and being electrically connected to a bonding pad in the step area, wherein:

the irregularly-shaped area includes a first arc-shaped edge adjacent to the display area and a second arc-shaped edge disposed opposite to the first arc-shaped edge; and in the irregularly-shaped area, the plurality of second touch pads is arc-shaped disposed between the first arc-shaped edge and the second arc-shaped edge.

* * * * *